United States Patent
Huang

(10) Patent No.: US 10,078,227 B2
(45) Date of Patent: Sep. 18, 2018

(54) AUTOSTEREOSCOPIC DISPLAY SCREEN AND AUTOSTEREOSCOPIC DISPLAY DEVICE USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 67 days.

(21) Appl. No.: 15/331,909

(22) Filed: Oct. 23, 2016

(65) Prior Publication Data
US 2017/0276953 A1 Sep. 28, 2017

(30) Foreign Application Priority Data
Mar. 24, 2016 (TW) .............................. 105109116 A

(51) Int. Cl.
| | |
|---|---|
| G02B 27/22 | (2018.01) |
| H04N 13/305 | (2018.01) |
| G02B 3/00 | (2006.01) |
| G02B 5/04 | (2006.01) |

(52) U.S. Cl.
CPC ......... G02B 27/2214 (2013.01); G02B 3/005 (2013.01); G02B 3/0043 (2013.01); G02B 3/0068 (2013.01); G02B 5/045 (2013.01); G02B 27/2242 (2013.01); H04N 13/305 (2018.05)

(58) Field of Classification Search
CPC ........... H04N 13/0404; H04N 13/0455; H04N 13/026; H04N 13/0007; H04N 13/305; H04N 13/302; G02B 27/2214; G02B 27/225; G02B 27/2242

USPC ................................ 359/621–623, 463, 462
See application file for complete search history.

(56) References Cited

U.S. PATENT DOCUMENTS

| | | | |
|---|---|---|---|
| 6,381,071 B1* | 4/2002 | Dona | G02B 3/0031 359/455 |
| 6,710,920 B1* | 3/2004 | Mashitani | G02B 27/2214 353/7 |
| 7,760,430 B2 | 7/2010 | Shestak et al. | |
| 8,427,527 B2 | 4/2013 | Visser et al. | |
| 2013/0057159 A1 | 3/2013 | Pijlman et al. | |

FOREIGN PATENT DOCUMENTS

| | | |
|---|---|---|
| TW | 200916831 A | 4/2009 |
| TW | I452342 B | 9/2014 |

* cited by examiner

*Primary Examiner* — Audrey Y Chang
(74) *Attorney, Agent, or Firm* — CKC & Partners Co., Ltd.

(57) ABSTRACT

An autostereoscopic display screen includes a light-deflecting component and a double-sided lenticular lens. The light-deflecting component is configured to deflect a light beam towards multiple directions. The double-sided lenticular lens includes a first cylindrical lens array, a second cylindrical lens array, and a central portion. The first cylindrical lens array includes first cylindrical lenses, in which each of the first cylindrical lenses has a first length in a first axial direction. The second cylindrical lens array includes second cylindrical lenses and at least one third cylindrical lens. The second cylindrical lenses have a second length in the first axial direction and the third cylindrical lens has a third length in the first axial direction, in which the first length is greater than the second length and the second length is greater than the third length. The central portion is disposed between the first and second cylindrical lens arrays.

20 Claims, 13 Drawing Sheets

112

AUTOSTEREOSCOPIC DISPLAY SCREEN AND AUTOSTEREOSCOPIC DISPLAY DEVICE USING THE SAME

RELATED APPLICATIONS

This application claims priority to Taiwanese Application Serial Number 105109116, filed Mar. 24, 2016, which is herein incorporated by reference.

BACKGROUND

Technical Field

The present disclosure relates to an autostereoscopic display screen and an autostereoscopic display device using the same.

Description of Related Art

With the development of technology, an optical product capable of showing stereoscopic image has been put under the spotlight in the consumer market. By exploiting the binocular parallax, a stereoscopic display device can display images individually to two eyes of an observer through optical elements, such that the observer can experience a stereoscopic image.

Unlike the types of stereoscopic display devices which require special glasses to distinguish left-eye and right-eye images, an autostereoscopic display device transmits light beams of different images to different spatial positions. Therefore, the eyes of an observer receive different images from different angles so that the observer perceives a stereoscopic image without the special glasses. Accordingly, autostereoscopic display technology address problems and inconveniences associated with using the special glasses.

SUMMARY

An aspect of the present disclosure provides an autostereoscopic display screen which includes a light-deflecting component and a double-sided lenticular lens. The autostereoscopic display screen is applicable in an autostereoscopic display device, in which the autostereoscopic display device includes an image emitter configured to provide an image signal. With the image emitter, the autostereoscopic display device can provide stereoscopic images using time-multiplex methods. Using the combination of the light-deflecting component and the double-sided lenticular lens, the autostereoscopic display screen can adjust a projected direction of a light beam passing through, such that the light beam's image signal passing through the autostereoscopic display screen can be projected towards more than one direction and provide stereoscopic images using spatial-multiplex methods. Further, the range of observable angle of the stereoscopic images can be increased with the use of the double-sided lenticular lens. According to one or more desired parameter settings, the dimensions of cylindrical lenses of the double-sided lenticular lens can be chosen or adjusted, thereby adjusting the observing zones provided by the autostereoscopic display screen.

An aspect of the present disclosure provides an autostereoscopic display screen including a light-deflecting component and a double-sided lenticular lens. The light-deflecting component is configured to receive a light beam and deflect the light beam towards a plurality of directions. The double-sided lenticular lens is disposed at a side of the light-deflecting component. The double-sided lenticular lens includes a first cylindrical lens array, a second cylindrical lens array, and a central portion. The first cylindrical lens array faces towards the light-deflecting component and includes a plurality of first cylindrical lenses, in which each of the first cylindrical lenses has a first length in a first axial direction. The second cylindrical lens array faces away from the light-deflecting component and includes a plurality of second cylindrical lenses and at least one third cylindrical lens. The second cylindrical lenses have a second length in the first axial direction and the third cylindrical lens has a third length in the first axial direction, in which the first length is greater than the second length and the second length is greater than the third length. The central portion is disposed between the first cylindrical lens array and the second cylindrical lens array, in which the first cylindrical lens array, the central portion, and the second cylindrical lens array are arranged along an axis that is substantially perpendicular to the first axial direction.

In some embodiments, the autostereoscopic display screen is applied to an autostereoscopic display device. The autostereoscopic display device includes an image emitter disposed at a side of the autostereoscopic display screen. The light-deflecting component of the autostereoscopic display screen is optically coupled between the image emitter and the double-sided lenticular lens, in which the image emitter is configured to emit an image signal towards the autostereoscopic display screen. The image signal has images provided in a time sequence In some embodiments, the light-deflecting component is configured to receive the image signal and deflect the image signal towards a number of traveling directions, and the first cylindrical lens array is configured to receive a deflected image signal and effect a formation of an image in the body. The formed image in the body has a fourth length in the first axial direction. The first length is configured using a $[(2*N+1)*S]$ calculation, the second length is configured using a $[(N+2)*S]$ calculation, and the third length is configured using a $[N*S]$ calculation, wherein S is the fourth length and N is a positive integer greater than one.

In some embodiments, a ratio of the number of the second cylindrical lenses to the number of the third cylindrical lenses is calculated using $[(M+1)/M]$, wherein M is a positive integer.

In some embodiments, at least two of the second cylindrical lenses are provided adjacent to each other.

In some embodiments, a group of the second cylindrical lenses and a group of the third cylindrical lenses are arranged alternately.

In some embodiments, the light-deflecting component has a plurality of refractive interfaces facing the double-sided lenticular lens. The refractive interfaces are arranged along a second axial direction and extend along a third axial direction orthogonal to the second axial direction. Each of the second axial direction and the third axial direction is different from the first axial direction. The light-deflecting component is configured to receive the light beam and deflect the light beam via the refractive interfaces towards a plurality of different deflected directions.

In some embodiments, the second axial direction and the third axial direction each deviate from the first axial direction with a substantially equal angle.

In some embodiments, the light-deflecting component includes a light entry surface and micro prisms facing the double-sided lenticular lens.

In some embodiments, the micro prisms are arranged along a fourth axial direction deviating from the first direction at an angle selected from a range between 30 degrees and 60 degrees.

In some embodiments, an optical axis of at least one of the first cylindrical lenses is parallel to an optical axis of one of the second cylindrical lenses, and an optical axis of at least one of the first cylindrical lenses is parallel to an optical axis of the third cylindrical lens.

An aspect of the present disclosure provides an autostereoscopic display device including an autostereoscopic display screen and an image emitter. The autostereoscopic display screen includes a light-deflecting component and a double-sided lenticular lens. The light-deflecting component is configured to allow a light beam to pass through it and deflect the light beam to travel towards multiple directions. The double-sided lenticular lens is disposed at a side of the light-deflecting component and the double-sided lenticular lens includes a first cylindrical lens array, a second cylindrical lens array, and a central portion. The first cylindrical lens array faces towards the light-deflecting component and includes a plurality of first cylindrical lenses, in which each of the first cylindrical lenses has a first length in a first axial direction. The second cylindrical lens array faces away from the light-deflecting component and includes a plurality of second cylindrical lenses and at least one third cylindrical lens. The second cylindrical lenses have a second length in the first axial direction and the third cylindrical lens has a third length in the first axial direction, in which the first length is greater than the second length and the second length is greater than the third length. The central portion is disposed between the first cylindrical lens array and the second cylindrical lens array. The first cylindrical lens array, the central portion, and the second cylindrical lens array are arranged along an axis that is substantially perpendicular to the first axial direction. The image emitter is disposed at a side of the autostereoscopic display screen such that the light-deflecting component is optically coupled between the image emitter and the double-sided lenticular lens. The image emitter is configured to emit towards the autostereoscopic display screen an image signal comprising a plurality of images provided in a time sequence.

DETAILED DESCRIPTION

Herein described "image" may include a light-source-distribution-image, or other image comprising a light source or light beams, as would be understood by a person skilled in the art. To clarify, a light-source-distribution-image comprises images of, or viewed from, one or more perspectives of a target scope of view. The light-source-distribution-image may also include images of the light source or light beams viewed at different time periods or intervals.

Figure 1:
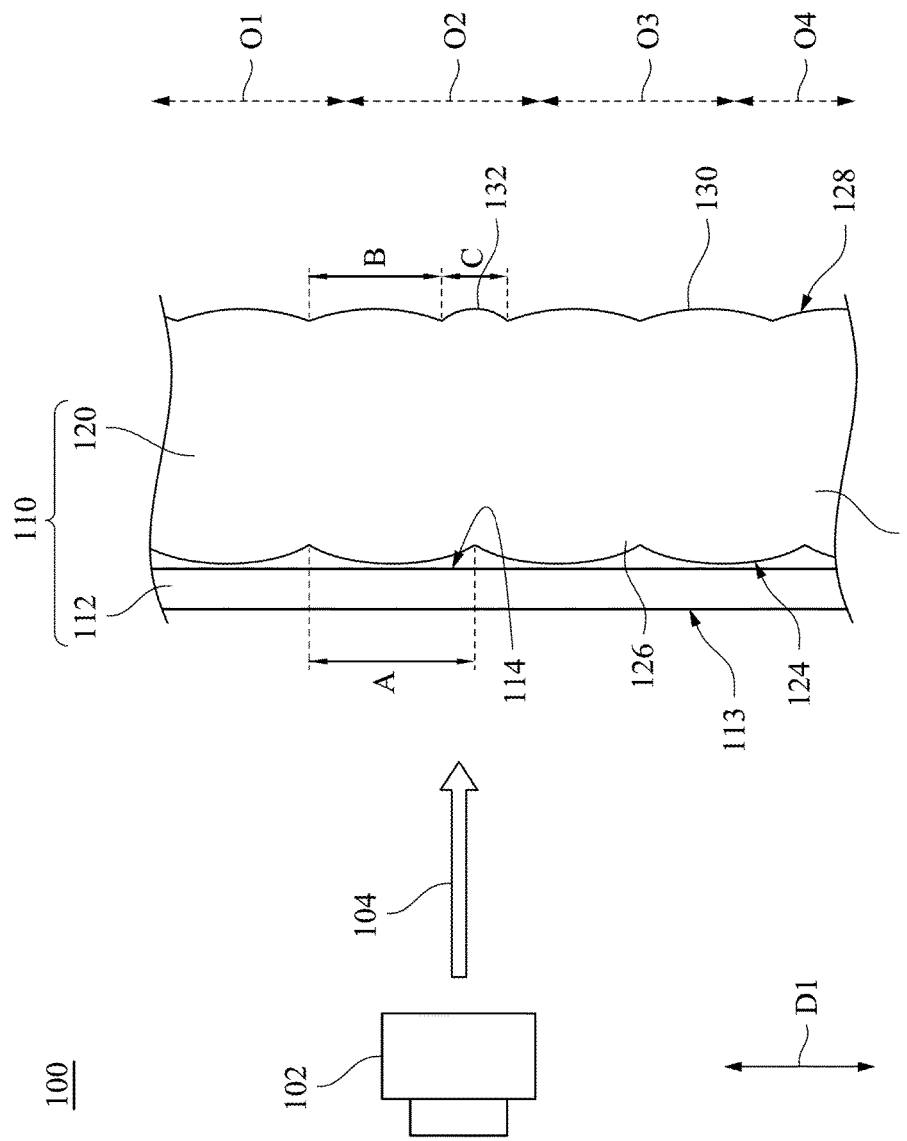
FIG. 1 is a schematic diagram showing a configuration of an autostereoscopic display device according to some embodiments of the present disclosure.

Referring to FIG. 1, an autostereoscopic display device 100 is shown providing observing zones O1-O4 with stereoscopic images by time-multiplexing and spatial-multiplexing. Although four observing zones are illustrated in FIG. 1, the number of the observing zones may be less or more than four. The observing zones O1-O4 are arranged along a first axial direction D1, in which the first axial direction D1 is a direction of a line connecting eyes of an observer viewing the autostereoscopic display device 100.

The autostereoscopic display device 100 includes an image emitter 102 and an autostereoscopic display screen 110. The image emitter 102 is disposed at one side of the autostereoscopic display screen 110 (distal to the observing zone O1-O4) and configured to emit an image signal 104 towards the autostereoscopic display screen 110, such that the image signal 104 emitted from the image emitter 102 can travel to the observing zones O1-O4 through the guidance provided by the configuration of the autostereoscopic display screen 110. The autostereoscopic display screen 110 includes a light-deflecting component 112 (which may be a micro-deflector) and a double-sided lenticular lens 120. The double-sided lenticular lens 120 is disposed at one side of the light-deflecting component 112 proximal to the observing zones O1-O4. The light-deflecting component 112 is optically coupled between the image emitter 102 and the double-sided lenticular lens 120.

The double-sided lenticular lens 120 includes a central portion 122, a first cylindrical lens array 124, and a second cylindrical lens array 128. The central portion 122 is disposed between the first cylindrical lens array 124 and the second cylindrical lens array 128. The central portion 122, the first cylindrical lens array 124, and the second cylindrical lens array 128 may be integrally formed as one central portion. The first cylindrical lens array 124 is disposed on the central portion 122 and located between the light-deflecting component 112 and the central portion 122. The second cylindrical lens array 128 is disposed on the central portion 122 and is opposite to the first cylindrical lens array 124. In one embodiment, the first cylindrical lens array 124, the central portion 122, and the second cylindrical lens array 128 are arranged along an arranging direction, and the first axial direction D1 is substantially perpendicular to the arranging direction.

The first cylindrical lens array 124 includes first cylindrical lenses 126, in which the first cylindrical lenses 126 are arranged along the first axial direction D1 and each of the first cylindrical lenses 126 has a first length A in the first axial direction D1. The second cylindrical lens array 128 includes second cylindrical lenses 130 and at least one third cylindrical lenses 132. Each of the second cylindrical lenses 130 has a second length B in the first axial direction D1, and the third cylindrical lens 132 has a third length C in the first axial direction D1. As shown, in the embodiment, the first length A is greater than the second length B and the second length B is greater than the third length C (A>B>C). Thus, the first cylindrical lenses 126, the second cylindrical lenses 128, and the third cylindrical lens 132 have different dimensions.

The configuration of the first cylindrical lens array 124 is not symmetrical to the second cylindrical lens array 128. With this arrangement, the image signal 104 emitted by the image emitter 102 can be distributed to desired positions through the double-sided lenticular lens 120, and the range zones to provide an observer with the stereoscopic images can be enlarged. Further details will be described later.

Referring to FIGS. 2A to 2D, the image emitter 102 provides example images 106 in a time sequence with a time-multiplex effect. For simplicity, the plurality of images 106, 106a, 106b, 106c are shown arranged along a horizontal direction, but can also be arranged along a vertical direction. Alternatively, the plurality of images 106, 106a, 106b, 106c can also be arranged as an array.

Figure 2A:
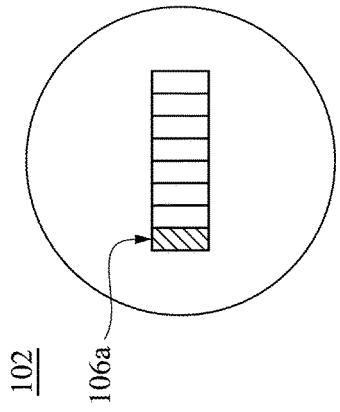
FIG. 2A is a front view of the image emitter of the autostereoscopic display device illustrated in FIG. 1.
Figure 2B:
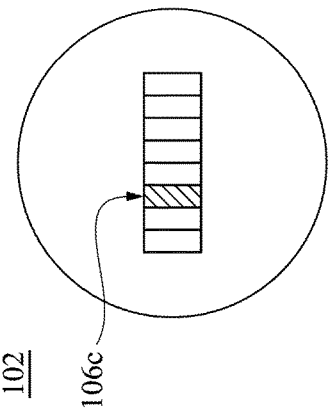
FIGS. 2B-2D are front views of different images emitted in a time sequence by the image emitter shown in FIG. 2A.
Figure 2C:
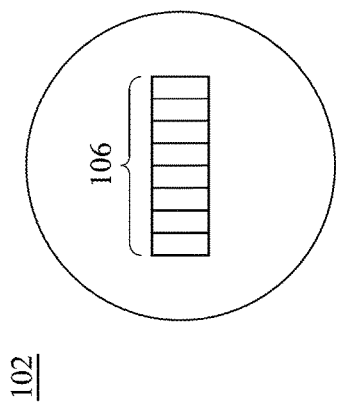
Figure 2D:
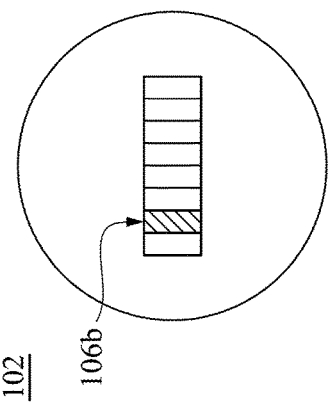

In FIG. 2B, the image emitter 102 emits the first image 106a at a first time point in the time sequence. In FIG. 2C, the image emitter 102 emits the second image 106b at a second time point in the time sequence. In FIG. 2D, the image emitter 102 emits the third image 106c at the third time point in the time sequence. In the example shown in FIGS. 2B-2D, the image emitter 102 can emit eight images 106 in the time sequence. Then, following this rule, after a whole time sequence (from the first time point to the eighth time point in the time sequence), a period of emitting the image signal 104 by the image emitter 102 is finished.

Figure 3A:
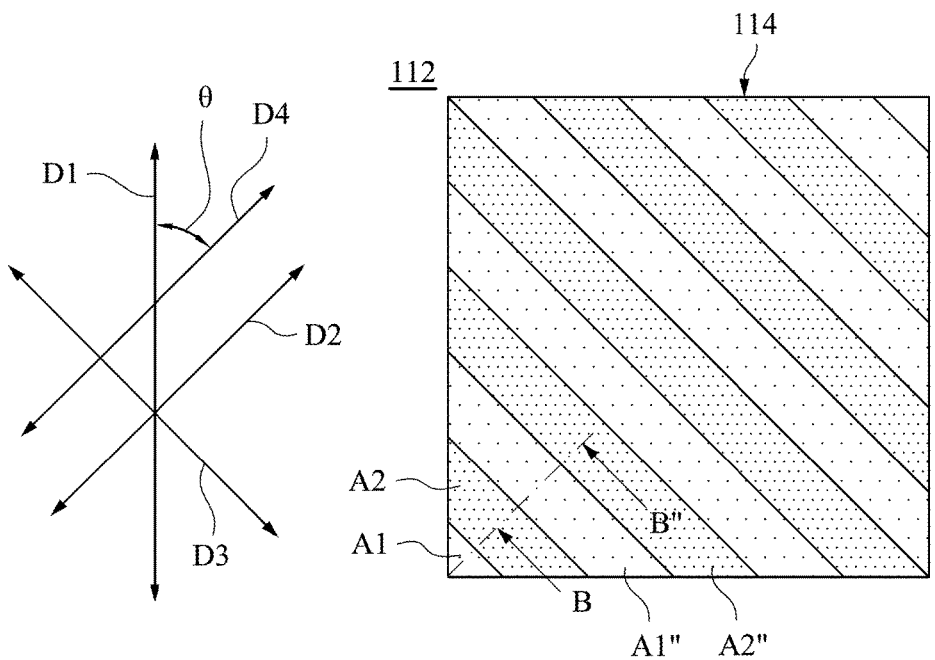
FIG. 3A is a front view of the light-deflecting component of the autostereoscopic display screen according to some embodiments of the present disclosure.

FIG. 3A shows a front view of the light-deflecting component 112. Here, the "front view" means viewing the light-deflecting component 112 from the double-sided lenticular lens 120. Referring back to FIG. 1, the light-deflecting component 112 includes a light entry surface 113 and a light exit surface 114 which are opposite each other, in which the light entry surface 113 faces the image emitter 102 and the light exit surface 114 faces the double-sided lenticular lens 120. In other words, the light-deflecting component 112 shown in FIG. 3A is viewed from the double-sided lenticular lens 120 onto the light exit surface 114 of the light-deflecting component 112. Also shown in FIG. 3A is the first axial direction D1 as illustrated in FIG. 1, a second axial direction D2, a third axial direction D3, and a fourth axial direction D4.

The light-deflecting component 112 has various refractive interfaces. For example, the light-deflecting component 112 has a first refractive interface A1 and a second refractive interface A2. The first refractive interfaces A1 and second refractive interfaces A2 are disposed on the light exit surface 114 of the light-deflecting component 112, facing the double-sided lenticular lens 120. The first refractive interface A1 and a second refractive interface A2 are shown in FIG. 3A represented by different patterns, and are repeatedly provided on the light exit surface 114. The plurality of the first refractive interfaces A1 and second refractive interfaces A2 are arranged along the second axial direction D2 and are parallel to each other wherein each interface extends along the third axial direction D3. The second axial direction D2 and the third axial direction D3 are orthogonal.

The light-deflecting component 112 is configured to allow a light beam to pass through and travel towards more than one direction. For example, a light beam passing through the light-deflecting component 112 can travel towards T traveling directions, T being a positive integer greater than one. In the present embodiment, the light-deflecting component 112 is a second-order light-deflecting component, and the image signal 104 emitted from the image emitter 102 can travel along two directions after passing through the light-deflecting component 112 (thus, the value M is 2).

Figure 3B:
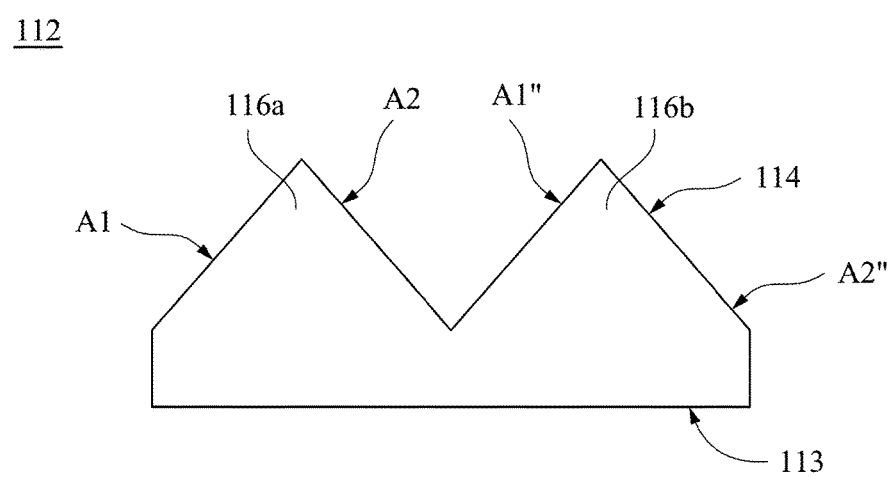
FIG. 3B is a cross-sectional diagram along dotted line B to B" illustrated in FIG. 3A.

Referring to FIGS. 3A and 3B, the light-deflecting component 112 can include micro prisms 116a and 116b, disposed opposite to the light entry surface 113. In other words, the micro prisms 116a and 116b are located between the light entry surface 113 and the double-sided lenticular lens 120. In the embodiment shown, the micro prisms 116a and 116b are arranged along a fourth axial direction D4, the fourth axial direction D4 being parallel to the second axial direction D2. Shown in FIG. 3A, the arrangement of the fourth axial direction D4 is slanted at an angle θ relative to the first axial direction D1, wherein the angle θ may be chosen from a range between 30 degrees to 60 degrees. For example, in some embodiments, the fourth axial direction D4 can be slanted at an angle θ of 45 degrees relative to the first axial direction D1. The third axial direction D3, being substantially perpendicular to the fourth axial direction D4, is then slanted at an angle θ of also 45 degrees relative to the first axial direction D1.

Shown in FIG. 3B, the refractive interfaces A1, A2 are formed by the surfaces of the micro prisms 116a and 116b. Referring to FIGS. 3A and 3B, the two light exit surfaces of the micro prism 116a respectively are the first refractive interface A1 and the second refractive interface A2, and the two light exit surfaces of the micro prism 116b respectively are the first refractive interface A1" and the second refractive interface A2". With this configuration, when the image signal 104 (see FIG. 1) emitted from the image emitter 102 (see FIG. 1) passes through the light-deflecting component 112, the image signal 104 can be deflected by the micro prisms 116a and 116b to travel along two directions which are different from each other.

The dimensions of the first refractive interfaces A1 and the second refractive interfaces A2 can be configured according to an expected image signal 104. For example, the width of each of the refractive interfaces in the second axial direction D2 can be slightly less or equal to a diagonal length of each image of the image signal 104 entering the light-deflecting component 112. Further, how many of the first refractive interfaces A1 and the second refractive interfaces A2 to be provided on the light exit surface 114 can be configured according to the number of the images expected from the image signal 104.

After the image signal 104 passes through the light-deflecting component 112, since the axial direction D3 (the extended direction of the refractive interfaces) is slanted at the angle of 45 degrees relative to the first axial direction D1, the image signal 104 passing through the light-deflecting component 112 has displacements in the horizontal direction and the vertical direction relatively to the original, and are about the same.

Figure 4A:
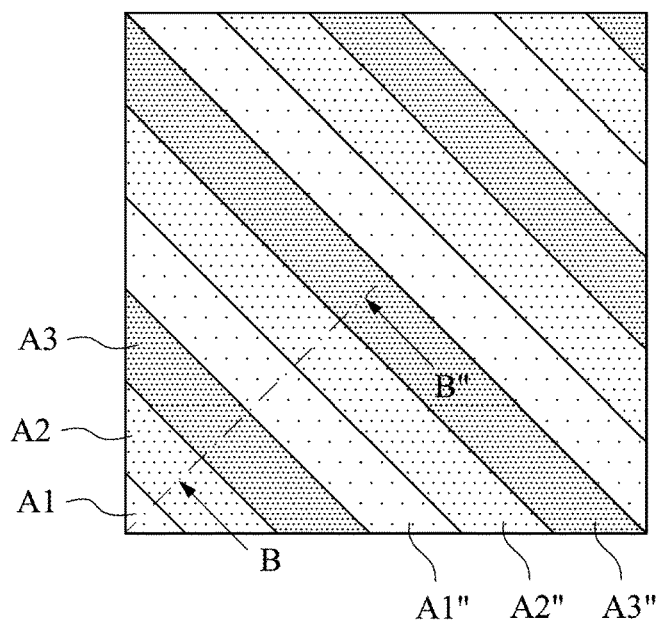
FIG. 4A is a front view of a light-deflecting component of the autostereoscopic display screen according to some embodiments of the present disclosure.
Figure 4B:
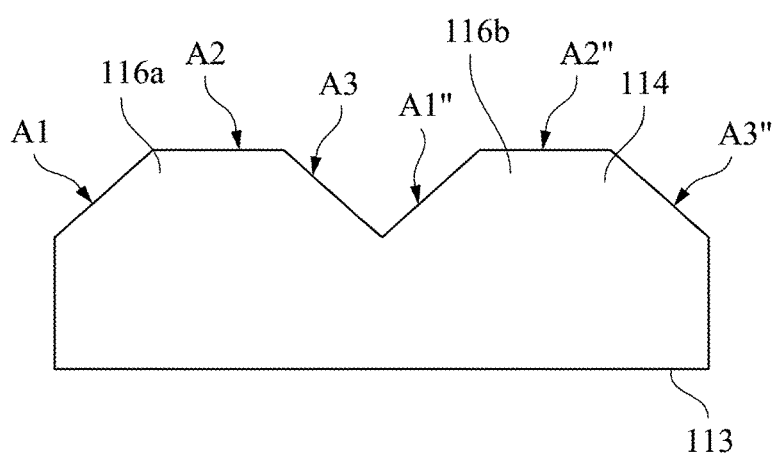
FIG. 4B is a cross-sectional diagram along dotted line B to B" illustrated in FIG. 4A.

Referring to FIGS. 4A and 4B, the light-deflecting component 112 is a third-order light-deflecting component having a first refractive interfaces A1, a second refractive interfaces A2, and a third refractive interfaces A3, which are illustrated with different patterns.

In FIG. 4B, the light-deflecting component 112 includes micro prisms 116a and 116b, in which the first refractive interfaces A1, the second refractive interfaces A2, and the third refractive interfaces A3 are three light exit surfaces of the micro prisms 116a and 116b. As shown, the three light exit surfaces of the micro prism 116a comprises the first refractive interface A1, the second refractive interface A2, and the third refractive interface A3, and the three light exit surfaces of the micro prism 116b comprises the first refractive interface A1", the second refractive interface A2", and the third refractive interface A3". Under this configuration, when the image signal 104 (see FIG. 1) emitted from the image emitter 102 (see FIG. 1) passes through the light-deflecting component 112, the image signal 104 can be deflected by the micro prisms 116a and 116b to travel along three directions which are different from each other.

Figure 5:
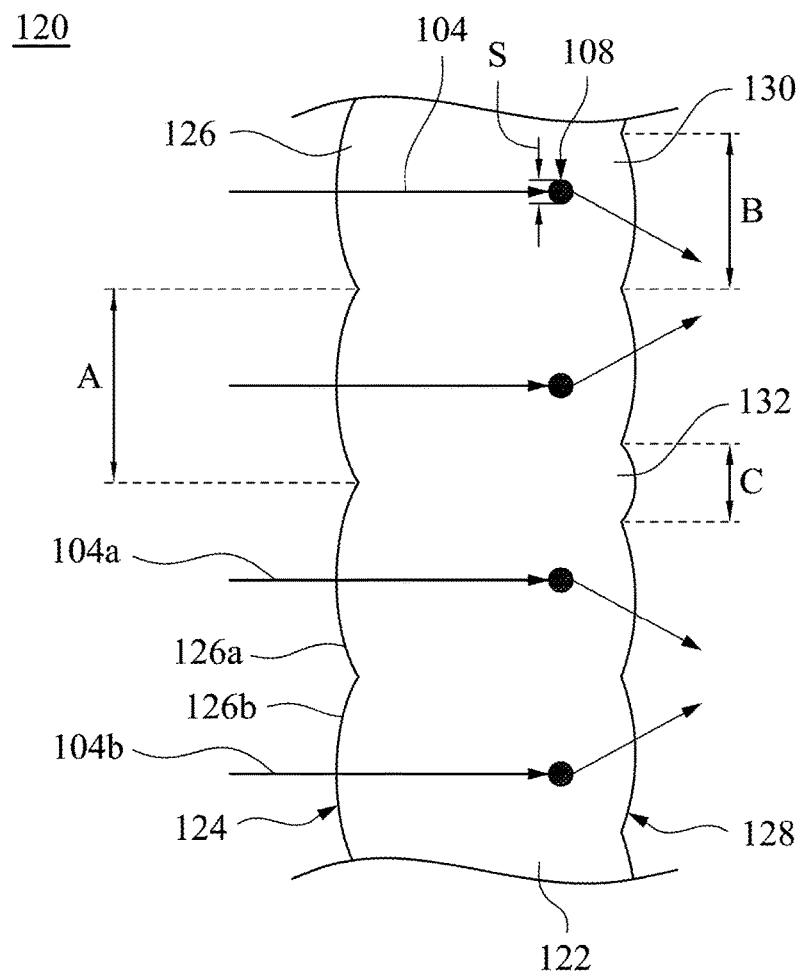
FIG. 5 is a schematic diagram showing an image signals after passing through the double-sided lenticular lens of the autostereoscopic display screen according to some embodiments of the present disclosure.

Referring to FIG. 5, after the image signal 104 provided by the image emitter 102 passes through the light-deflecting component 112, the image signal deflected by the light-deflecting component 112 then enters the double-sided lenticular lens 120. In some embodiments, the autostereoscopic display screen 110 (see FIG. 1) can further include a Fresnel lens (not illustrated). The Fresnel lens can be disposed between the light-deflecting component 112 and the double-sided lenticular lens 120 and configured to make the image signal 104 passing through the light-deflecting component 112 to parallely enter the double-sided lenticular lens 120. After the image signal 104 enters the double-sided lenticular lens 120, the image signal 104 is imaged in the central portion 122 through the first cylindrical lens array 124, such that the image signal 104 imaged in the central portion 122 can become an imaged signal 108. The imaged signal 108 has a fourth length S in the first axial direction D1.

The length in the first axial direction D1 of the first cylindrical lenses 126, the second cylindrical lenses 130, and the third cylindrical lens 132 can be calculated according to parameters of the autostereoscopic display device 100. In the following, the first length A of each of the first cylindrical lenses 126 in the first axial direction D1 is expressed as A, the second length B of each of the second cylindrical lenses 130 in the first axial direction D1 is expressed as B, and the third length C of the third cylindrical lenses 132 in the first axial direction D1 is expressed as C. The magnitude of the first length A may be calculated by $[(2*N+1)*S]$, the magnitude of the second length B may be calculated by $[(N+2)*S]$, and the magnitude of the third length C may be calculated by $[N*S]$, wherein N is a positive integer greater than one. In some embodiments, the positive integer N is the number of the projected directions of the image signal 104 passing through the double-sided lenticular lens 120 in the autostereoscopic display screen 110. For example, after a parallel light beam passes through the double-sided lenticular lens 120, the parallel light beam can be projected to N direction by the double-sided lenticular lens 120.

Further, the arrangement of the second cylindrical lenses 130 and the third cylindrical lens 132 can be calculated according the positive integer N. In some embodiments, the third cylindrical lens 132 may be more than one. In the following, the position of each of the second cylindrical lenses 130 is expressed as X, and the position of each of the third cylindrical lenses 132 is expressed as Y. The arrangement of the second cylindrical lenses 130 and the third cylindrical lenses 132 can be expressed as $[X(XY)^{(N-1)}]$, and the second cylindrical lenses 130 and the third cylindrical lenses 132 are arranged with this arranging rule. For example, for the positive integer N being 2, the second cylindrical lenses 130 and the third cylindrical lenses 132 can be arranged as [XXY]. Thus, to extend this arrangement, the second cylindrical lenses 130 and the third cylindrical lenses 132 can be repeatedly arranged using the rule [XXYXXYXXY . . . ]. For the positive integer N being equal to 3, the second cylindrical lenses 130 and the third cylindrical lenses 132 can be arranged as [XXYXY . . . ]. Similarly, the second cylindrical lenses 130 and the third cylindrical lenses 132 can be repeatedly arranged using the rule [XXYXYXXYXYXXYXY . . . ]. Under this arrangement, at least two of the second cylindrical lenses 130 are adjacent to each other. In other words, none of the other lenses (for example, the third cylindrical lenses 132) is disposed between the adjacent second cylindrical lenses 130. In addition, a portion of the second cylindrical lenses 130 and a portion of the third cylindrical lenses 132 are arranged alternately. Moreover, a ratio of the number of the second cylindrical lenses 130 to the third cylindrical lenses 132 may be calculated by $[(M+1)/M]$, wherein M is a positive integer. Thus, the number of the second cylindrical lenses 130 can be set to be one more than the number of the third cylindrical lenses 132.

Illustrated in FIG. 5, a light beam passing through the double-sided lenticular lens 120 travels toward two directions, and thus the positive integer N is equal to 2. Therefore, according to the calculation of the first length A, the second length B, and the third length C described above, the first length A is equal to 5S, the second length B is equal to 4S, and the third length is equal to 2S. In the first cylindrical lens array 124, the first cylindrical lenses 126 are repeatedly arranged. In the second cylindrical lens array 128, the second cylindrical lenses 130 and the third second cylindrical lenses 132 are arranged periodically. In the periodical arrangement of the second cylindrical lenses 130 and the third second cylindrical lenses 132, two second cylindrical lenses 130 are provided, and then one third second cylindrical lens 132 is provided.

As previously described, since the first cylindrical lens array 124 and the second cylindrical lens array 128 are not symmetrical to each other, there is at least one shift relationship between the first cylindrical lens array 124 and the second cylindrical lens array 128. For example, the optical axis of at least one of the first cylindrical lenses 126 and the optical axis of one of the second cylindrical lenses 128 are parallel and do not coincide with each other. In addition, the optical axis of at least one of the first cylindrical lenses 126 and the optical axis of the third cylindrical lens 132 are parallel and not coincided with each other.

With the shift relationship between the cylindrical lenses of the first cylindrical lens array 124 and the second cylindrical lens array 128, the image signal 104 entering the double-sided lenticular lens 120 can be projected towards the different direction. For example, the image signals 104a and 104b entering the double-sided lenticular lens 120 through the first cylindrical lenses 126a and 126b are shown projecting towards different directions.

After a light beam passes through the double-sided lenticular lens 120, the light beam traveling towards the observing zones O1-O4 can have a wider angle of divergence relative to the light beam emitted from the image emitter 102. Therefore, the angle of divergence of the image signal 104 can be increased by the double-sided lenticular lens 120. In other words, the autostereoscopic display screen 110 (see FIG. 1) can increase the range of the observable angle of the image through the double-sided lenticular lens 120.

Figure 6:
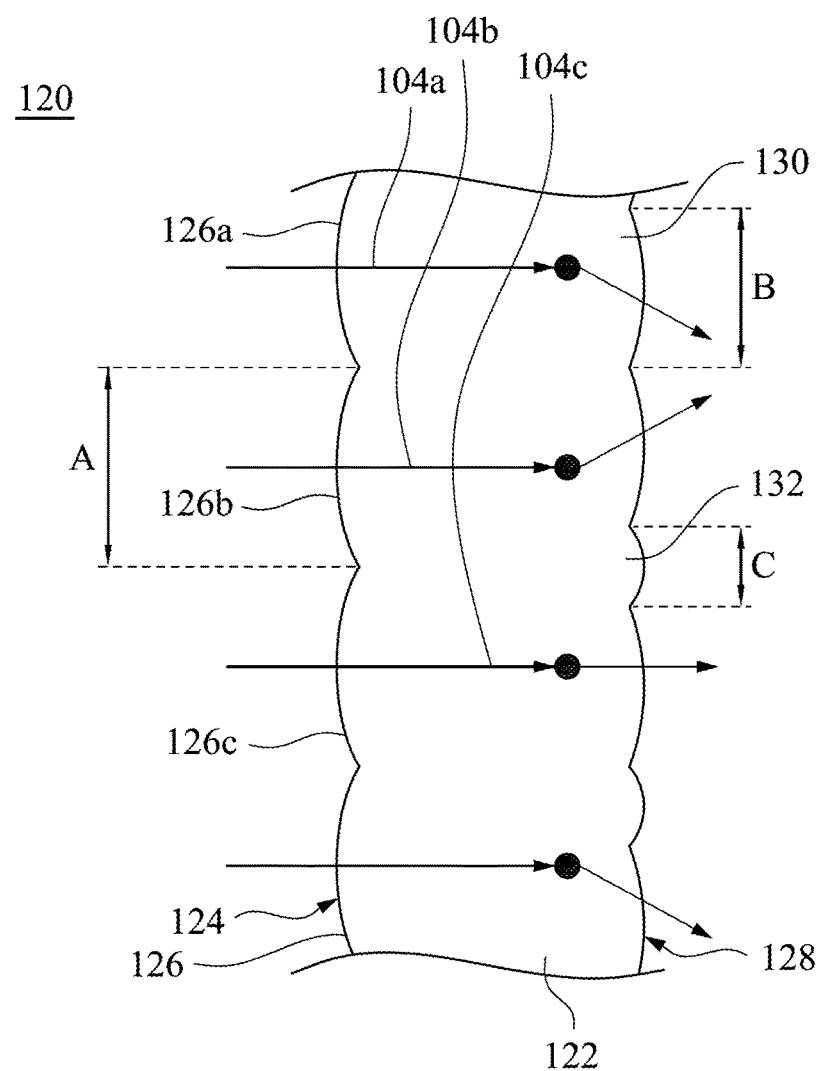
FIG. 6 is a schematic diagram of a double-sided lenticular lens of the autostereoscopic display screen according to some embodiments of the present disclosure.

Referring to FIG. 6, the double-sided lenticular lens 120 allows a light beam passing through to travel towards three directions, and thus the positive inter N is equal to 3. For example, the image signals 104a, 104b, and 104c entering the double-sided lenticular lens 120 through the first cylindrical lenses 126a, 126b, and 126c can be projected towards the different directions.

According to the calculation for the first length A, the second length B, and the third length C described above, the first length A is equal to 7S, the second length B is equal to 5S, and the third length is equal to 3S. In the first cylindrical lens array 124, the first cylindrical lenses 126 are arranged repeatedly. In the second cylindrical lens array 128, the second cylindrical lenses 130 and the third second cylindrical lenses 132 are arranged periodically. In the periodical arrangement of the second cylindrical lenses 130 and the third second cylindrical lenses 132, two second cylindrical lenses 130 are provided, one third second cylindrical lens 132 is provided, one second cylindrical lens 130 is provided, and then one third second cylindrical lens 132 is provided in sequence.

Figure 7:
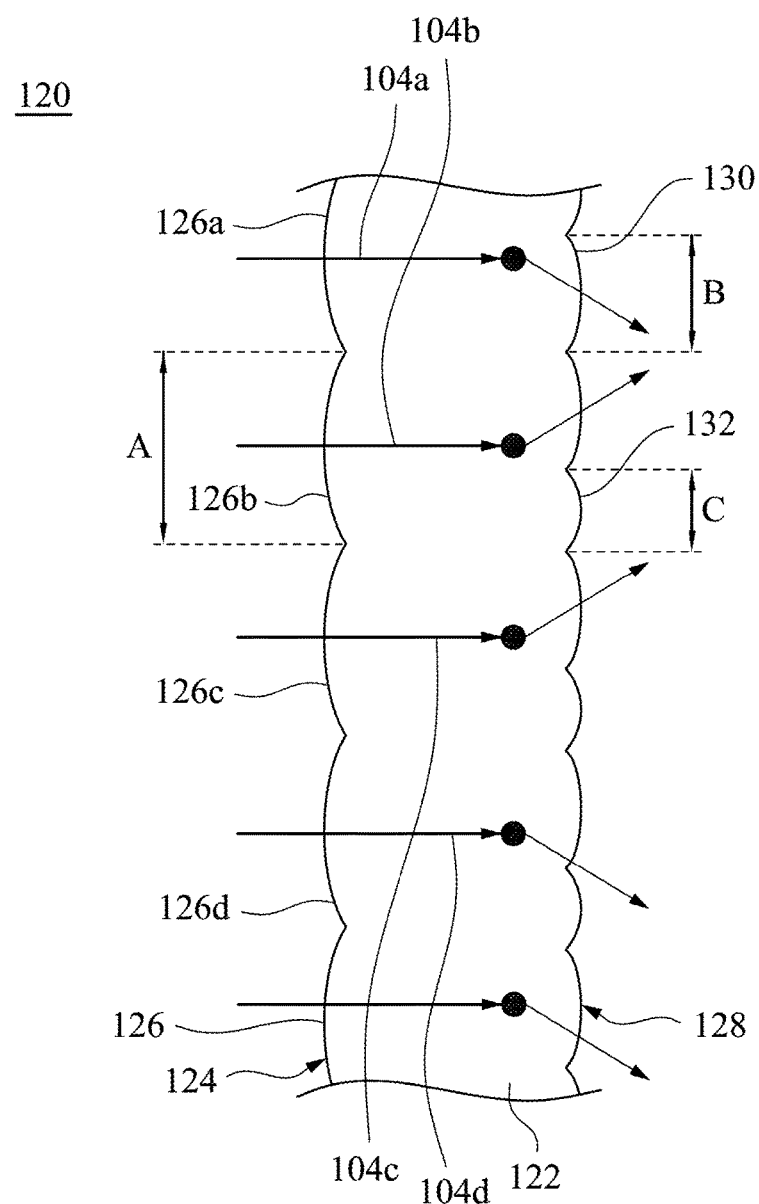
FIG. 7 is a schematic diagram of a double-sided lenticular lens of the autostereoscopic display screen according to some embodiments of the present disclosure.

Referring to FIG. 7, the double-sided lenticular lens 120 allows a light beam passing through to travel towards four directions, and thus the positive inter N is equal to 4. For example, the image signals 104a, 104b, 104c, and 104d entering the double-sided lenticular lens 120 through the first cylindrical lenses 126a, 126b, 126c, and 126d can be projected towards different directions.

Using the calculation of the first length A, the second length B, and the third length C previously described, the first length A is equal to 9S, the second length B is equal to 6S, and the third length is equal to 4S. In the first cylindrical lens array 124, the first cylindrical lenses 126 are arranged repeatedly. In the second cylindrical lens array 128, the second cylindrical lenses 130 and the third second cylindrical lenses 132 are arranged periodically. In the periodical arrangement of the second cylindrical lenses 130 and the third second cylindrical lenses 132, two second cylindrical lenses 130 are provided, one third second cylindrical lens 132 is provided, one second cylindrical lens 130 is provided, one third second cylindrical lens 132 is provided, one second cylindrical lens 130 is disposed, and then one third second cylindrical lens 132 is provided in sequence.

Figure 8A:
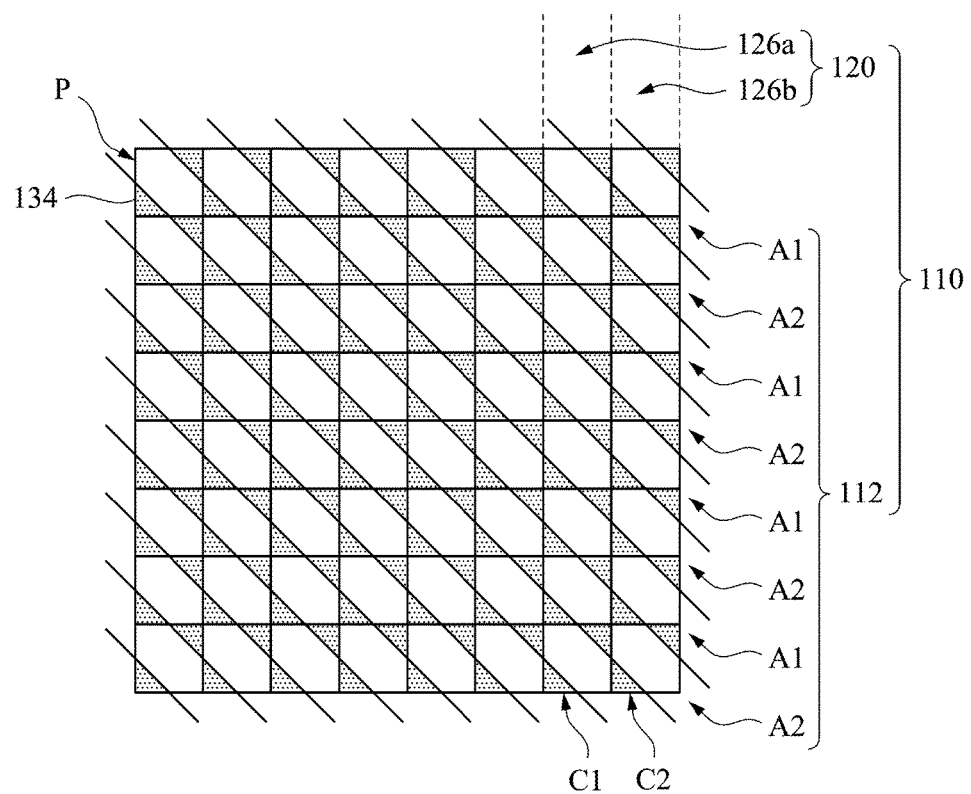
FIG. 8A is a schematic diagram showing the image guided by the autostereoscopic display screen according to some embodiments of the present disclosure.

The following describes the effects provided by the combination of the light-deflecting component and the double-sided lenticular lens. Referring to FIG. 8A, in the present embodiment, a second-order light-deflecting component and a double-sided lenticular lens with the positive integer N being equal to 2 are used. Shown in FIG. 8A, each segment of the grid can be taken as a pixel P of the images of the image signal. Each of the diagonal lines represents a boundary between adjacent refractive interfaces of the light-deflecting component 112, for example the first refractive interfaces expressed as A1 and the second refractive interfaces expressed as A2. Each of the vertical dot-line represents the boundary of the adjacent first cylindrical lenses 126a and 126b of the double-sided lenticular lens 120, in which the images passing through the first cylindrical lenses 126a and 126b can be projected towards two directions. In addition, the autostereoscopic display screen 110 can further include block components 134, shown in shaded patterns. The block components 134 can be adhered on the light-deflecting component 112.

With the configuration of the light-deflecting component 112, the double-sided lenticular lens 120, and the block components 134 described above, each of the pixels P can correspond to one of the first cylindrical lenses (the first cylindrical lens 126a or 126b) and also one of the refractive interfaces (the first refractive interface A1 or the second refractive interface A2), such that the image signal 104 (see FIG. 1) provided by the image emitter 102 (see FIG. 1) can be projected towards more than one direction. Thus, since the light-deflecting component 112 can project a light beam passing through towards two directions and the double-sided lenticular lens 120 can project a light beam passing through towards two directions through the first cylindrical lenses 126a or 126b, after the image signal 104 provided by the image emitter 102 passed through the light-deflecting component 112 and the double-sided lenticular lens 120, the image signal 104 can be projected towards four directions (equal to the product of the T traveling directions and the positive integer N).

Figure 8B:
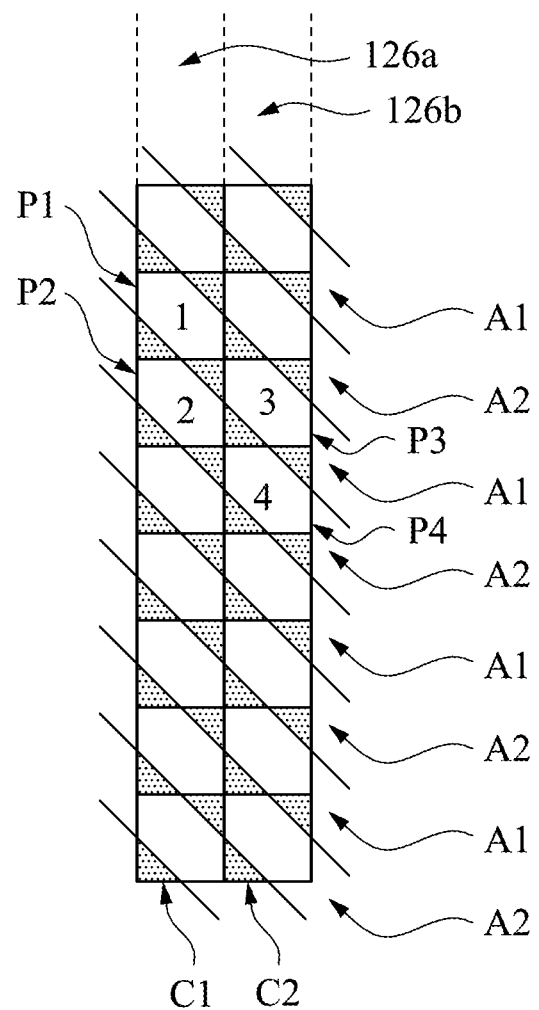
FIG. 8B is a schematic diagram of columns C1 and C2 illustrated in FIG. 8B.

As shown in FIGS. 8A and 8B, the pixel P1 (the grid segment marked as 1) corresponds to the first cylindrical lens 126a and the first refractive interface A1, the pixel P2 (the grid segment marked as 2) corresponds to the first cylindrical lens 126a and the second refractive interface A2, the pixel P3 (the grid segment marked as 3) corresponds to the first cylindrical lens 126b and the second refractive interface A1, and the pixel P4 (the grid segment marked as 4) corresponds to the first cylindrical lens 126b and the second refractive interface A2. After image signals of the pixels P1-P4 pass through the light-deflecting component and the double-sided lenticular lens, the pixels P1-P4 each travel towards different directions. In other words, after the image signal 104 (see FIG. 1) provided by the image emitter 102 (see FIG. 1) passes the autostereoscopic display screen 110, the image signal 104 is projected towards four directions. Therefore, the autostereoscopic display screen 110 can provide whole images to the observing zones using a spatial-multiplex way.

Figure 9A:
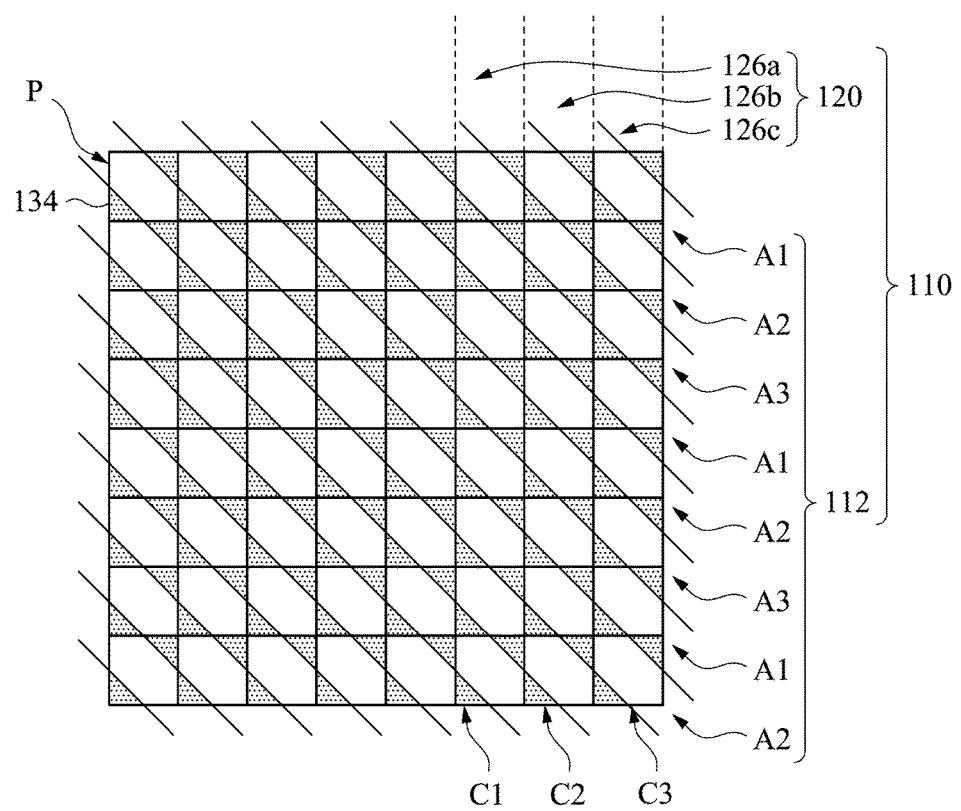
FIG. 9A is a schematic diagram showing the image guided by the autostereoscopic display screen according to some embodiments of the present disclosure.

Referring to FIG. 9A, a third-order light-deflecting component 112 and a double-sided lenticular lens 120 with a positive integer N being equal to 3 are used. In the present embodiment, since the light-deflecting component 112 can project a light beam passing through towards three directions and the double-sided lenticular lens 120 can project a light beam passing through towards three directions, after the image signal 104 (see FIG. 1) provided by the image emitter 102 (see FIG. 1) passed through the light-deflecting component 112 and the double-sided lenticular lens 120, the image signal 104 can be projected towards nine directions (the number of the projected directions is equal to the product of the T traveling directions and the positive integer N).

In FIG. 9A, each of the grid segments can be taken as a pixel P of the images of the image signal 104 (see FIG. 1). Each of the diagonal lines represents a boundary between the adjacent refractive interfaces of the light-deflecting component 112, in which the first refractive interfaces A1, the second refractive interfaces A2, and the third refractive interfaces A3 are illustrated. Each of the vertical dot-line represents the boundary of the adjacent first cylindrical lenses 126a, 126b, and 126c of the double-sided lenticular lens 120, in which the images passing through the first cylindrical lenses 126a, 126b, and 126c can be projected towards three directions. The block components 134 are illustrated as shaded patterns in FIG. 9A.

Figure 9B:
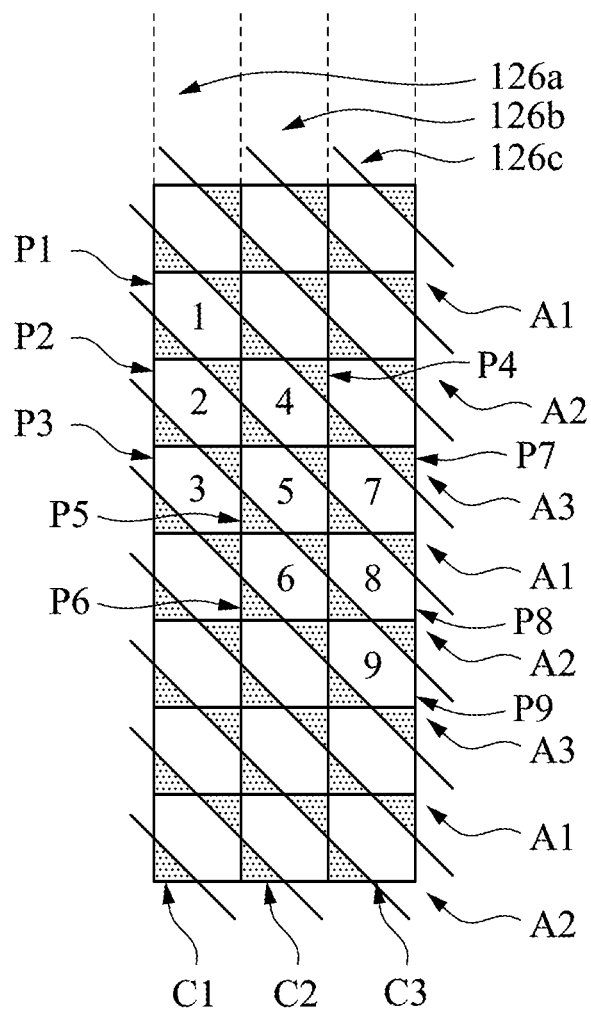
FIG. 9B is a schematic diagram of columns C1 to C3 illustrated in FIG. 9A.

As shown in FIGS. 9A and 9B, the pixel P1 (the grid segment marked as 1) corresponds to the first cylindrical lens 126a and the first refractive interface A1. The pixel P2 (the grid segment marked as 2) corresponds to the first cylindrical lens 126a and the second refractive interface A2. The pixel P3 (the grid segment marked as 3) corresponds to the first cylindrical lens 126a and the third refractive interface A3. The pixel P4 (the grid segment marked as 4) corresponds to the first cylindrical lens 126b and the first refractive interface A1. The pixel P5 (the grid segment marked as 5) corresponds to the first cylindrical lens 126b and the second refractive interface A2. The pixel P6 (the grid segment marked as 6) corresponds to the first cylindrical lens 126b and the third refractive interface A3. The pixel P7 (the grid segment marked as 7) corresponds to the first cylindrical lens 126c and the first refractive interface A1. The pixel P8 (the grid segment marked as 8) corresponds to the first cylindrical lens 126c and the second refractive interface A2. The pixel P9 (the grid segment marked as 9) corresponds to the first cylindrical lens 126c and the third refractive interface A3. After image signals of the pixels P1-P9 pass through the light-deflecting component 112 and the double-sided lenticular lens 120, the image signals of the pixels P1-P9 travel towards nine directions which are different from each other. In other words, after the image signal 104 (see FIG. 1) provided by the image emitter 102 (see FIG. 1) passes the autostereoscopic display screen 110, the image signal 104 is projected towards nine directions.

Figure 10A:
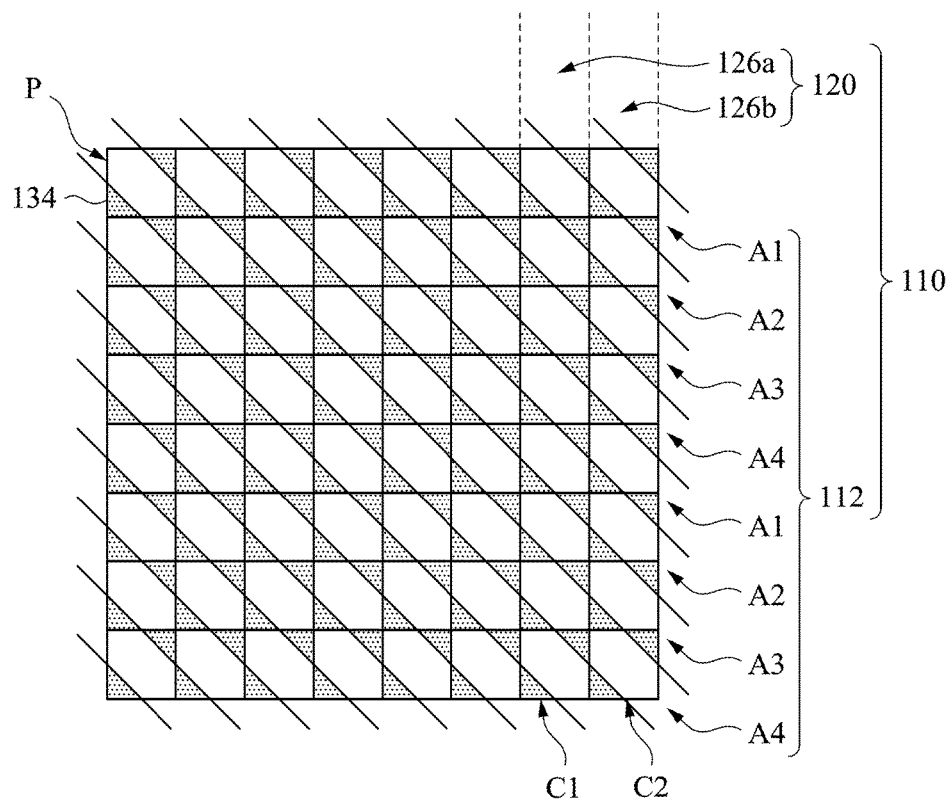
FIG. 10A is a schematic diagram showing the image guided by the autostereoscopic display screen according to some embodiments of the present disclosure.

Referring to FIG. 10A, a fourth-order light-deflecting component 112 and a double-sided lenticular lens 120 with a positive integer N being equal to 2 are used. In the present embodiment, the light-deflecting component 112 can project a light beam passing through towards four directions and the double-sided lenticular lens 120 can project a light beam passing through towards two directions. After the image signal 104 (see FIG. 1) provided by the image emitter 102 (see FIG. 1) passes through the light-deflecting component 112 and the double-sided lenticular lens 120, the image signal 104 can be projected towards eight directions (the number of the projected directions is equal to the product of the T traveling directions and the positive integer N).

In FIG. 10A, each of the grid segments can be taken as a pixel P of the images of the image signal 104 (see FIG. 1). Each of the diagonal lines represents a boundary between the adjacent refractive interfaces of the light-deflecting component 112. The first refractive interfaces A1, the second refractive interfaces A2, the third refractive interfaces A3, and the fourth refractive interfaces A4 are illustrated in FIG. 10A. Each of the vertical dot-line represents the boundary of the adjacent first cylindrical lenses 126a and 126b of the double-sided lenticular lens 120, in which the images passing through the first cylindrical lenses 126a and 126b can be projected towards two directions. The block components 134 are illustrated as shaded patterns in FIG. 10A.

Figure 10B:
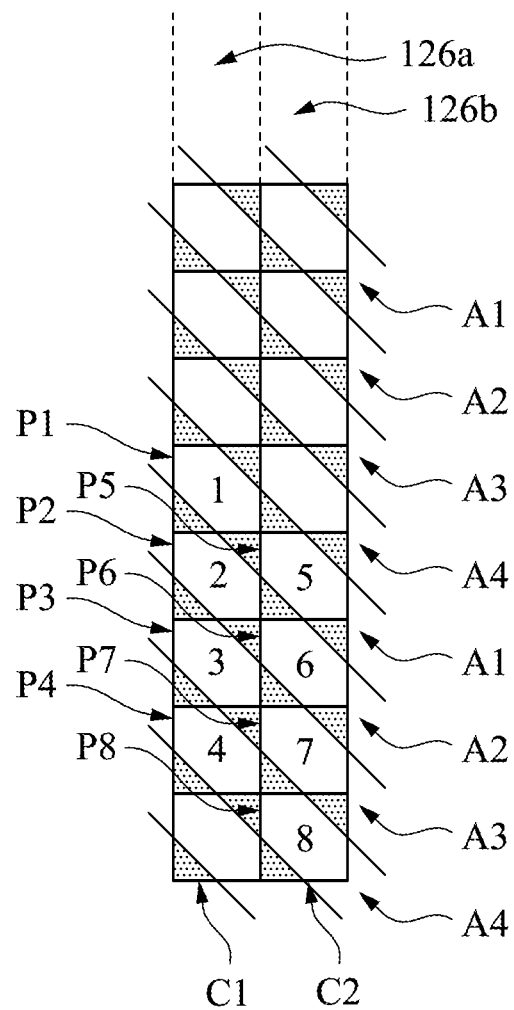
FIG. 10B is a schematic diagram of columns C1 and C2 illustrated in FIG. 10A.

As shown in FIGS. 10A and 10B, the pixel P1 (the grid segment marked as 1) corresponds to the first cylindrical lens 126a and the first refractive interface A1. The pixel P2 (the grid segment marked as 2) corresponds to the first cylindrical lens 126a and the second refractive interface A2. The pixel P3 (the grid segment marked as 3) corresponds to the first cylindrical lens 126a and the third refractive interface A3. The pixel P4 (the grid segment marked as 4) corresponds to the first cylindrical lens 126a and the fourth refractive interface A4. The pixel P5 (the grid segment marked as 5) corresponds to the first cylindrical lens 126b and the first refractive interface A1. The pixel P6 (the grid segment marked as 6) corresponds to the first cylindrical lens 126b and the second refractive interface A2. The pixel P7 (the grid segment marked as 7) corresponds to the first cylindrical lens 126b and the third refractive interface A3. The pixel P8 (the grid segment marked as 8) corresponds to the first cylindrical lens 126b and the second refractive interface A4. After the image signals of the pixels P1-P8 pass through the light-deflecting component 112 and the double-sided lenticular lens 120, the image signals of the pixels P1-P8 travel towards eight directions which are different from each other. In other words, after the image signal 104 (see FIG. 1) provided by the image emitter 102 (see FIG. 1) passes the autostereoscopic display screen 110, the image signal 104 is projected towards eight directions.

The present disclosure has been described with reference to certain embodiments and it is envisaged that other embodiments are possible. The spirit and scope of the appended claims should be understood in light of, but may not be limited to, the description of the embodiments contained herein. Although the terms first, second, third etc. may be used to describe various elements, components, regions, layers and/or sections, these elements, components, regions, layers and/or sections should not be limited by these terms. It will be apparent to those skilled in the art that modifications and variations can be made to the structure of the present disclosure without departing from the scope or spirit of the invention. In view of the foregoing, it is intended that the present disclosure cover modifications and variations of the present disclosure provided they fall within the scope of the following claims.

What is claimed is:

1. An autostereoscopic display screen, comprising:
a light-deflecting component configured to receive a light beam and deflect the light beam towards a plurality of directions; and
a double-sided lenticular lens disposed at a side of the light-deflecting component, wherein the light-deflecting component comprises a light entry surface and a plurality of micro prisms facing the double-sided lenticular lens, and the double-sided lenticular lens comprises:
a first cylindrical lens array facing towards the light-deflecting component and comprising a plurality of first cylindrical lenses, each having a first length in a first axial direction;
a second cylindrical lens array facing away from the light-deflecting component and comprising a plurality of second cylindrical lenses having a second length in the first axial direction, and at least one third cylindrical lens having a third length in the first axial direction, wherein the first length is greater than the second length and the second length is greater than the third length; and
a central portion disposed between the first cylindrical lens array and the second cylindrical lens array, wherein the first cylindrical lens array, the central portion, and the second cylindrical lens array are arranged along an axis that is substantially perpendicular to the first axial direction.

2. The autostereoscopic display screen of claim 1 applied to an autostereoscopic display device comprising an image emitter disposed at a side of the autostereoscopic display screen, wherein the light-deflecting component is optically coupled between the image emitter and the double-sided lenticular lens, and wherein the image emitter is configured to emit towards the autostereoscopic display screen an image signal comprising a plurality of images provided in a time sequence.

3. The autostereoscopic display screen of claim 2, wherein the light-deflecting component is configured to receive the image signal and deflect the image signal towards a number of traveling directions, and the first cylindrical lens array is configured to receive a deflected image signal and effect a formation of an image in the central portion, the formed image in the central portion having a fourth length in the first axial direction, wherein
the first length is configured using a [(2*N+1)*S] calculation and the second length is configured using a [(N+2)*S] calculation, the third length is configured using a [N*S] calculation, and wherein S is the fourth length and N is a positive integer greater than one.

4. The autostereoscopic display screen of claim 1, wherein a ratio of the number of the second cylindrical lenses to the number of the third cylindrical lenses is calculated using [(M+1)/M], wherein M is a positive integer.

5. The autostereoscopic display screen of claim 4, wherein at least two of the second cylindrical lenses are provided adjacent to each other.

6. The autostereoscopic display screen of claim 4, wherein a group of the second cylindrical lenses and a group of the third cylindrical lenses are arranged alternately.

7. The autostereoscopic display screen of claim 1, wherein the light-deflecting component has a plurality of refractive interfaces facing the double-sided lenticular lens, wherein the refractive interfaces are arranged along a second axial direction and extend along a third axial direction orthogonal to the second axial direction, each of the second axial direction and the third axial direction is different from the first axial direction, and wherein the light-deflecting component is configured to receive the light beam and deflect the light beam via the refractive interfaces towards a plurality of different deflected directions.

8. The autostereoscopic display screen of claim 7, wherein the second axial direction and the third axial direction each deviate from the first axial direction with a substantially equal angle.

9. The autostereoscopic display screen of claim 1, wherein the micro prisms are arranged along a fourth axial direction deviating from the first axial direction at an angle selected from a range between 30 degrees and 60 degrees.

10. The autostereoscopic display screen of claim 1, wherein an optical axis of at least one of the first cylindrical lenses is parallel to an optical axis of one of the second cylindrical lenses, and an optical axis of at least one of the first cylindrical lenses is parallel to an optical axis of the third cylindrical lens.

11. An autostereoscopic display device, comprising:
an autostereoscopic display screen comprising:
a light-deflecting component configured to allow a light beam to pass through it and deflect the light beam to travel towards multiple directions; and
a double-sided lenticular lens disposed at a side of the micro-light-deflecting component, wherein the light-deflecting component comprises a light entry surface and a plurality of micro prisms located between the light entry surface and the double-sided lenticular lens, and the double-sided lenticular lens comprises:
a first cylindrical lens array facing towards the light-deflecting component and comprising a plurality of first cylindrical lenses each having a first length in a first axial direction;
a second cylindrical lens array facing away from the light-deflecting component and comprising a plurality of second cylindrical lenses each having a second length in the first axial direction, and at least one third cylindrical lens having a third length in the first axial direction, wherein the first length is greater than the second length and the second length is greater than the third length; and
a central portion disposed between the first cylindrical lens array and the second cylindrical lens array, wherein the first cylindrical lens array, the central portion, and the second cylindrical lens array are arranged along an axis that is substantially perpendicular to the first axial direction; and
an image emitter disposed at a side of the autostereoscopic display screen such that the light-deflecting component is optically coupled between the image emitter and the double-sided lenticular lens, wherein the image emitter is configured to emit towards the autostereoscopic display screen an image signal comprising a plurality of images provided in a time sequence.

12. The autostereoscopic display device of claim 11, wherein the image signal is imaged in the central portion through the first cylindrical lens array, and the image has a fourth length represented by S in the first axial direction, wherein a magnitude of the first length and a magnitude of [(2*N+1)*S] are substantially the same, a magnitude of the second length and a magnitude of [(N+2)*S] are substantially the same, a magnitude of the third length and a magnitude of [N*S] are substantially the same, and N is a positive integer greater than one.

13. The autostereoscopic display device of claim 11, wherein a ratio of the number of the second cylindrical lenses to the number of the third cylindrical lenses is substantially the same as the magnitude of [(M+1)/M], wherein M is a positive integer.

14. The autostereoscopic display device of claim 13, wherein at least two of the second cylindrical lenses are adjacent to each other.

15. The autostereoscopic display device of claim 13, wherein a portion of the second cylindrical lenses and a portion of the third cylindrical lenses are arranged alternately.

16. The autostereoscopic display device of claim 11, wherein the light-deflecting component has a plurality of refractive interfaces facing the double-sided lenticular lens, wherein the refractive interfaces are arranged along a second axial direction and extend along a third axial direction such that the second axial direction and the third axial direction are orthogonal and at least one of the second axial direction and the third axial direction is different from the first axial direction, wherein the light-deflecting component allows the light beam passing through to travel towards a plurality of deflected directions via the refractive interfaces, and wherein any two of the deflected directions are different from each other.

17. The autostereoscopic display device of claim 16, wherein an angle between the second axial direction and the third axial direction is divided equally by the first axial direction.

18. The autostereoscopic display device of claim 11, wherein the micro prisms are arranged along a fourth axial direction slanted at an angle relative to the first axial direction, and wherein the angle is in a range between 30 degrees and 60 degrees.

19. An autostereoscopic display screen, comprising:
a light-deflecting component configured to receive a light beam and deflect the light beam towards a plurality of directions; and
a double-sided lenticular lens disposed at a side of the light-deflecting component, the double-sided lenticular lens comprising:
  a first cylindrical lens array facing towards the light-deflecting component and comprising a plurality of first cylindrical lenses, each having a first length in a first axial direction;
  a second cylindrical lens array facing away from the light-deflecting component and comprising a plurality of second cylindrical lenses having a second length in the first axial direction, and at least one third cylindrical lens having a third length in the first axial direction, wherein the first length is greater than the second length and the second length is greater than the third length; and
  a central portion disposed between the first cylindrical lens array and the second cylindrical lens array, wherein the first cylindrical lens array, the central portion, and the second cylindrical lens array are arranged along an axis that is substantially perpendicular to the first axial direction;
wherein the light-deflecting component has a plurality of refractive interfaces facing the double-sided lenticular lens, wherein the refractive interfaces are arranged along a second axial direction and extend along a third axial direction orthogonal to the second axial direction, each of the second axial direction and the third axial direction is different from the first axial direction, and wherein the light-deflecting component is configured to receive the light beam and deflect the light beam via the refractive interfaces towards a plurality of different deflected directions.

20. The autostereoscopic display screen of claim 19, wherein the second axial direction and the third axial direction each deviates from the first axial direction with a substantially equal angle.

\* \* \* \* \*